3,379,789
PROCESS FOR PREPARING BLOCK POLYMERS OF A POLYEPOXIDE AND POLYOXYMETHYLENE
Klaus Weissermel and Hans Dieter Hermann, Frankfurt am Main, and Siegfried Noetzel, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Aug. 4, 1964, Ser. No. 387,486
Claims priority, application Germany, Aug. 8, 1963, F 40,443
2 Claims. (Cl. 260—823)

The present invention relates to a process for preparing block polymers.

It is known to prepare block polymers containing polyoxymethylene units, for example, by polymerizing formaldehyde in an inert solvent in which a polymer containing active hydrogen is dissolved. Since, however, the active hydrogen undergoes a transfer reaction with the polyoxymethylene the yield of true block polymer is diminished and, moreover, the molecular weight of the polymers is reduced.

According to another method block polymers are prepared by masticating polyoxymethylene at a temperature within the range of, for example, 190° to 200° C., with another polymer in the presence of a free radical forming catalyst. However, when operating according to that method a considerable degradation of the polymer cannot be avoided.

Now we have found that valuable block polymers can be prepared from formaldehyde and an epoxide by prepolymerizing an epoxide compound in the presence of a known anionically active catalyst in an inert solvent and then introducing anhydrous formaldehyde, while mixing well, into the mixture containing the polyepoxide, the anhydrous formaldehyde being grafted on to the polyepoxide. This process has the advantage that the prepolymerized epoxide does not contain active hydrogen atoms. Molecular weight and yield of block polymers are consequently not reduced. The preparation of the block polymers of high molecular weight according to the invention is simple as compared with that according to the known methods.

For the preparation of the block polymers may be used all epoxides, for example, alkylene oxides, such as ethylene oxide and, in particular, propylene oxide or isobutylene oxide, substituted epoxides such as epichlorohydrin, perfluoropropylene oxide and 1-chloro-3,4-epoxybutane, cycloaliphatic epoxides such as cyclohexene oxide and vinyl cyclohexene oxide, epoxide ethers such as methyl or phenyl glycidyl ether, unsaturated glycidyl compounds such as alkyl glycidyl ether and glycide acrylate and epoxide compounds such as styrene oxide and butadiene dioxide.

As catalysts may be used all known anionically active compounds which are capable of polymerizing both epoxide and formaldehyde. Suitable catalysts are, for example, alkali hydroxides, organo-metal compounds and alcoholates. There may be used in particular the hydroxides and alcoholates of lithium, sodium, potassium, rubidium and cesium, organo-metal compounds of lithium, sodium, potassium, magnesium, zinc and aluminum and aluminum triethyl, lithium butyl, zinc diethyl, phenyl magnesium bromide, diethyl aluminum chloride and phenyl potassium. The catalysts disclosed in U.S. Patent 2,848,437 are also suitable.

The concentration in which the catalysts are to be used depends on their efficiency and on the molecular weight of the polymers that is desired and it can be ascertained in every case by simple preliminary experiments. It is in general within the range of 0.001 to 10 moles percent, calculated on the quantity of monomers used. The polymerization can be brought about in inert organic solvents, for example, aromatic substances such as toluene, ethyl benzene or isopropyl benzene, aliphatic substances such as butane, hexane or heptane or in mineral oil fractions that have been freed from oxygen, sulfur and unsaturated compounds, alicyclic substances such as cyclohexane and methyl cyclohexane, chlorinated hydrocarbons such as trifluorethylene or carbon tetrachloride and ethers such as diethyl ether or diisopropyl ether. The polymerization can also take place in the liquid monomers themselves.

According to a preferred mode of carrying out the process of the invention the prepolymerization of the epoxide is carried out by adding the epoxide in the course of the reaction to the solvent containing the catalyst which has first been placed into the reaction vessel. The anhydrous formaldehyde which should contain less than 0.5%, preferably less than 0.1%, of impurities is purified in known manner and continuously introduced into the reaction medium. It is advantageous to stir the reaction mixture vigorously while the formaldehyde is being added. The prepolymerization of the epoxide and the graft polymerization of the prepolymerized epoxide with the formaldehyde can be carried out at a temperature within the range of −100° to +120° C. When the process is carried out discontinuously the prepolymerization in general requires a reaction time within the range of some minutes to 1 to 2 days. The time of the graft of polymerization of the prepolymerized epoxide formaldehyde may be within the range of some minutes to 5 hours. The polymerization may also be carried out continuously, for example, in a cascade of two reactors, the prepolymerization of the epoxide being carried out in the first and the graft polymerization of the prepolymerized epoxide with the formaldehyde being carried out in the second reactor. Before the beginning of the graft polymerization of the prepolymerized epoxide with the formaldehyde a further quantity of inert solvent, a further quantity of catalyst which need not be identical with the catalyst that has first been used, or stabilizers may be added to the reaction medium. The additives must, however, not deactivate the active polyepoxide.

The block polymers obtained can be processed in known manner, most advantageously by expelling the solvent which is preferably done by means of steam. It is also suitable to precipitate the polymer and then to filter it off. It is indicated to subject the polymers, after their processing, to a stabilization process. The terminal oxymethylene groups of the polymers can be closed in the usual way, for example, by esterification or etherification. The thermostability of the polymers can be further improved by the addition of usually applied stabilizers, for example, phenols, aromatic amines and/or amides.

The polymers can be used for many purposes. Their properties depend, on the one hand, on the kind of epoxide used and, on the other hand, on the amount of formaldehyde that has been incorporated by polymerization. Polymers having a higher content of polyepoxide are usually tough waxes or elastomers whereas polymers having a higher content of polyformaldehyde are often rigid, tough plastics. The polymers can therefore be used, for example, for the preparation of synthetic rubbers or for the manufacture of shaped articles by injection moulding, extrusion moulding or compression moulding.

The following examples serve to illustrate the invention but they are not intended to limit it thereto.

Example 1

17 cc. of a catalyst solution which had been prepared from 247 cc. of aluminum triethyl, 15.7 cc. of water, 92 cc. of acetyl acetone, 480 cc. of diethyl ether and 820 cc. of heptane, were added to 500 cc. of dry heptane. The quantity of catalyst used, calculated on the 1,2-propylene oxide to be polymerized, amounted to 2 moles percent, calculated on the aluminum triethyl used. After-heating to 50° C., 50 grams of 1,2-propylene oxide were introduced dropwise, while stirring, in the course of 20 minutes and the polymerization batch was kept for 4½ hours at 50° C. Polymerization set in immediately after the addition of the 1,2-propylene oxide. Then gaseous formaldehyde was introduced for 20 minutes in a constant current into the polymerization vessel. The formaldehyde was produced by the degradation of 50 grams of paraformaldehyde in 250 cc. of sinarol at a temperature within the range of 120° to 150° C. in a round-bottom flask which was connected with two cooling towers. The cooling towers were filled with coils of stainless steel and cooled to −10° C. The apparatus in which the formaldehyde was developed had to be kept scrupulously clean in order to avoid any polymerization of formaldehyde at the glass walls. After the reaction batch had been processed 49 grams of a block polymer were obtained.

10 grams of the block polymer were dissolved at 140° C. in 200 cc. of benzyl alcohol in the presence of 1 gram of diphenyl amine and the resulting solution was poured into 2 liters of methanol. 0.1 gram of pure polyoxymethylene remained behind as a residue. From the methanolic filtrate 9 grams of a block polymer containing 75% of polypropylene oxide were precipitated out with water.

Example 2

50 cc. of dried heptane and 17 cc. of the catalyst solution described in Example 1 were placed into a reaction vessel and 50 grams of 1,2-propylene oxide were added dropwise at 25° C. in the course of 20 minutes, while stirring. Polymerization set in immediately. After a polymerization period of another 45 minutes formaldehyde was introduced into the polymerization vessel for 20 minutes. The cheesy polymer was filtered off and dried. 14.2 grams of a white powder were obtained. The powder was a block polymer which consisted of 80% of polyoxymethylene having a reduced viscosity of 0.7 (determined in butyrolactone of 0.5% strength in the presence of 2% of diphenyl amine, at 140° C.).

Example 3

400 cc. of dried heptane and 200 cc. of the catalyst described in Example 1 were heated to 60° C. At this temperature 20 grams of phenyl glycidyl ether were dropped in, while stirring, in the course of 10 minutes. After the phenyl glycidyl ether had been prepolymerized for one hour, pure formaldehyde was introduced into the polymerization vessel for 20 minutes. A steam distillation yielded 21.8 grams of solid block polymer which contained 27% of formaldehyde that had been incorporated with it by polymerization.

We claim:
1. A process for preparing, block polymer which comprises prepolymerizing an epoxide compound, selected from the group consisting of an alkylene oxide, epichlorohydrin, perfluoropropylene oxide, 1-chloro-3,4-epoxybutane, cyclohexane oxide, vinyl cyclohexene oxide, phenyl glycidyl ether, alkyl glycidyl ether, glycidyl acrylate, styrene oxide and butadiene dioxide in the presence of an organo-metal compound of aluminum as a catalyst in an inert solvent, introducing anhydrous formaldehyde into the mixture containing the polyepoxide and polymerizing the formaldehyde onto the prepolymerized epoxide compound, while stirring well and recovering said polymer having as the major component the polyepoxide blocks.

2. A process as claimed in claim 1, wherein the epoxide compound used is propylene oxide wherein said propylene oxide constitutes at least 75% of the block polymer.

References Cited

UNITED STATES PATENTS 3,219,725   11/1965   Kirkland et al. _____ 260—823

MURRAY TILLMAN, *Primary Examiner.*

D. J. BREZNER, M. J. TULLY, *Assistant Examiners.*